(12) United States Patent
Zheng et al.

(10) Patent No.: US 10,784,475 B2
(45) Date of Patent: Sep. 22, 2020

(54) CAP ASSEMBLY FOR A SECOND BATTERY AND SECOND BATTERY

(71) Applicant: Contemporary Amperex Technology Co., Limited, Ningde, Fujian (CN)

(72) Inventors: Yulian Zheng, Ningde (CN); Chengyou Xing, Ningde (CN); Quankun Li, Ningde (CN); Peng Wang, Ningde (CN); Lulu Bai, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 176 days.

(21) Appl. No.: 15/873,527

(22) Filed: Jan. 17, 2018

(65) Prior Publication Data

US 2019/0109305 A1  Apr. 11, 2019

(30) Foreign Application Priority Data

Oct. 10, 2017 (CN) .......................... 2017 1 0935598

(51) Int. Cl.
*H01M 2/04* (2006.01)
*H01M 2/30* (2006.01)
(Continued)

(52) U.S. Cl.
CPC ......... *H01M 2/0473* (2013.01); *H01M 2/043* (2013.01); *H01M 2/06* (2013.01);
(Continued)

(58) Field of Classification Search
CPC ........ H01M 2/0473; H01M 2/08; H01M 2/06; H01M 2/305; H01M 2/043; H01M 2/0482;
(Continued)

(56) References Cited

U.S. PATENT DOCUMENTS

2011/0244310 A1* 10/2011 Kim .................... H01M 2/0212
429/158

FOREIGN PATENT DOCUMENTS

| CN | 1579027 A | 2/2005 |
|---|---|---|
| CN | 102376931 A | 3/2012 |

(Continued)

OTHER PUBLICATIONS

English translation of JP2013161692.*
(Continued)

*Primary Examiner* — Milton I Cano
*Assistant Examiner* — Kiran Akhtar
(74) *Attorney, Agent, or Firm* — Law Offices of Liaoteng Wang

(57) ABSTRACT

The present disclosure provides a cap assembly for a secondary battery and a secondary battery. The cap assembly includes a cap plate, a fixing member, a connecting member and an electrode terminal, wherein the cap plate has an electrode lead-out hole; the fixing member is fixed to the cap plate through the connecting member and provided with a weakened portion that is close to a center line of the cap plate in a width direction of the cap plate; and the electrode terminal includes a terminal board, wherein the terminal board has an outer peripheral surface at least partially surrounded by the fixing member so that the electrode terminal is fixed to the fixing member, and the terminal board is provided on a side of the cap plate and covers the electrode lead-out hole.

18 Claims, 5 Drawing Sheets

(51) Int. Cl.
  *H01M 2/06* (2006.01)
  *H01M 2/08* (2006.01)
  *H01M 2/02* (2006.01)
  *H01M 2/12* (2006.01)

(52) U.S. Cl.
  CPC ............ *H01M 2/08* (2013.01); *H01M 2/305* (2013.01); *H01M 2/021* (2013.01); *H01M 2/027* (2013.01); *H01M 2/0456* (2013.01); *H01M 2/0482* (2013.01); *H01M 2/12* (2013.01); *H01M 2/1241* (2013.01); *H01M 2/30* (2013.01); *H01M 2200/20* (2013.01); *H01M 2220/20* (2013.01)

(58) Field of Classification Search
  CPC .... H01M 2/12; H01M 2/021; H01M 2220/20; H01M 2200/20; H01M 2/30; H01M 2/027; H01M 2/0456; H01M 2/1241
  See application file for complete search history.

(56) References Cited

FOREIGN PATENT DOCUMENTS

| CN | 205657096 | * | 10/2016 | ............. H01M 2/04 |
| CN | 205657096 U | | 10/2016 | |
| JP | 2013161692 | * | 8/2013 | ............. H01G 11/00 |
| JP | 2013161692 A | | 8/2013 | |

OTHER PUBLICATIONS

English translation of CN205657096.*
The first Office Action and search report dated May 12, 2020 for Chinese Application No. 201710935598.7, 8 pages.
The second Office Action and search report dated Jun. 15, 2020 for Chinese Application No. 201710935598.7, 7 pages.

* cited by examiner

CAP ASSEMBLY FOR A SECOND BATTERY AND SECOND BATTERY

CROSS-REFERENCE TO RELATED APPLICATION

This application is based upon and claims priority to Chinese Patent Application No. 201710935598.7, filed on Oct. 10, 2017, the content of which is incorporated herein by reference in its entirety.

TECHNICAL FIELD

The present disclosure relates to the technical field of energy storage devices, and in particular, to a cap assembly for a secondary battery and a secondary battery.

BACKGROUND

New energy vehicles are widely promoted in the country and even in the world. However, in order to completely replace fuel vehicles, there are many areas for improvement. For example, there are a few problems such as low travelling mileages of vehicles, high cost of battery packs, reliability of battery packs and the like, which need to be further solved.

Currently, a power battery usually adopts a square hard shell structure. A shell of the power battery includes a case and a cap assembly. The shell of the power battery provides a closed space for accommodating an electrode assembly and electrolyte. The power of the electrode assembly is led out of the closed space through a terminal of the cap assembly.

In a conventional cap assembly, a manner of fixing the terminal is as follows: a cap plate is provided with a through hole; the terminal includes a base portion and an extension portion; and the base portion has a cross-sectional area larger than an area of the through hole. During assembly, the base portion is located under the cap plate (i.e. inside the case), and the extension portion is fixed by a clamp spring or a riveting member after passing through the through hole. In this way, the terminal is fixed to the cap plate. With such a fixing manner, the cap assembly may employ a large number of mechanical components, thereby increasing the cost of the secondary battery and reducing the reliability of the cap assembly. Meanwhile, since the base portion is located inside the case, space utilization inside the case may be reduced and thus energy density of the power battery may be reduced. In order to solve this problem, a terminal board may be employed to be disposed at a side of the cap plate; a fixing member and a connecting member may be provided; the fixing member may be fixed to the cap plate through the connecting member; and at least part of an outer peripheral surface of the terminal board may be surrounded by the fixing member so that the terminal board may be fixed to the fixing member. However, when the cap plate is deformed to form an arch due to a large amount of gas generated inside the case of the secondary battery (the cap plate is deformed to form an arch because two edges of the cap plate in its width direction are welded to the case, the deformations of the two edges in the width direction are small, and the deformation of a middle region of the cap plate in the width direction is large), due to a large rigidity of the fixing member, the fixing member may not form an arch along with the cap plate, so the gaps between two sides of the cap plate in the width direction and the fixing member may be increased (even the connecting member may be pulled off). Thus it may not be possible to tightly press a sealing member between the terminal board and the cap plate, thereby causing air leakage or liquid leakage of the secondary battery.

SUMMARY

According to an aspect of the present disclosure, a cap assembly for a secondary battery is provided. The cap assembly includes a cap plate, a fixing member, a connecting member and an electrode terminal, wherein the cap plate has an electrode lead-out hole; the fixing member is fixed to the cap plate through the connecting member and provided with a weakened portion that is close to a center line of the cap plate in a width direction of the cap plate; and the electrode terminal includes a terminal board, wherein the terminal board has an outer peripheral surface at least partially surrounded by the fixing member so that the electrode terminal is fixed to the fixing member, and the terminal board is provided on a side of the cap plate and covers the electrode lead-out hole.

According to an aspect of the present disclosure, the fixing member includes at least two weakened portions that are respectively located on two sides of the electrode lead-out hole in a length direction of the cap plate as well as on the center line of the cap plate in the width direction of the cap plate.

According to an aspect of the present disclosure, the weakened portion includes an opening portion that is formed on a surface of the fixing member on a side away from the cap plate.

According to an aspect of the present disclosure, the opening portion penetrates through the fixing member along a length direction of the cap plate; or the opening portion penetrates through the fixing member along a thickness direction of the cap plate.

According to an aspect of the present disclosure, one of the terminal board and the fixing member is provided with a recess, and the other one of the terminal board and the fixing member is provided with a protrusion to be matched with the recess, so that relative rotation between the electrode terminal and the fixing member is limited by engagement of the recess and the protrusion.

According to an aspect of the present disclosure, the recess is provided on the outer peripheral surface of the terminal board, and the protrusion to be matched with the recess is provided on an inner surface of the fixing member in contact with the terminal board.

According to an aspect of the present disclosure, the terminal board is provided with a notch on a surface of the terminal board on a side close to the cap plate or on a side away from the cap plate, and the notch extends along a length direction of the cap plate and is close to the center line of the cap plate in the width direction of the cap plate.

According to an aspect of the present disclosure, the connecting member includes an undercut and an undercut hole; the undercut hole is provided on a surface of the cap plate facing the fixing member; the undercut hole has an aperture gradually increasing along a direction from the fixing member to the cap plate; and the undercut is connected to the fixing member and has a shape adapted to a shape of the undercut hole so as to be engaged with the undercut hole.

According to an aspect of the present disclosure, the cap assembly further includes a sealing member that is provided between the terminal board and the cap plate and surrounds the electrode lead-out hole so as to seal the electrode lead-out hole.

According to an aspect of the present disclosure, the sealing member is provided with an annular groove on a surface of the sealing member on a side facing the cap plate; the cap plate is provided with an annular flange to be matched with the groove on a surface of the cap plate on a side facing the sealing member; and the flange is inserted into the groove.

According to another aspect of the present disclosure, a secondary battery is provided. The secondary battery includes a case having an opening; an electrode assembly accommodated in the case, including a first electrode plate, a second electrode plate and a separator disposed between the first electrode plate and the second electrode plate; and the cap assembly as described above, wherein the cap assembly covers the opening of the case so as to enclose the electrode assembly in the case.

BRIEF DESCRIPTION OF THE DRAWINGS

The present disclosure may be better understood from the following descriptions of specific embodiments of the present disclosure by taken in conjunction with the accompanying drawings, in which.

Other features, objects, and advantages of the present disclosure will become more apparent by reading the following detailed descriptions of non-limiting embodiments with reference to the accompanying drawings, in which the same or similar reference signs denote the same or similar features.

REFERENCE LABELS IN THE FIGURES

Figure 1:
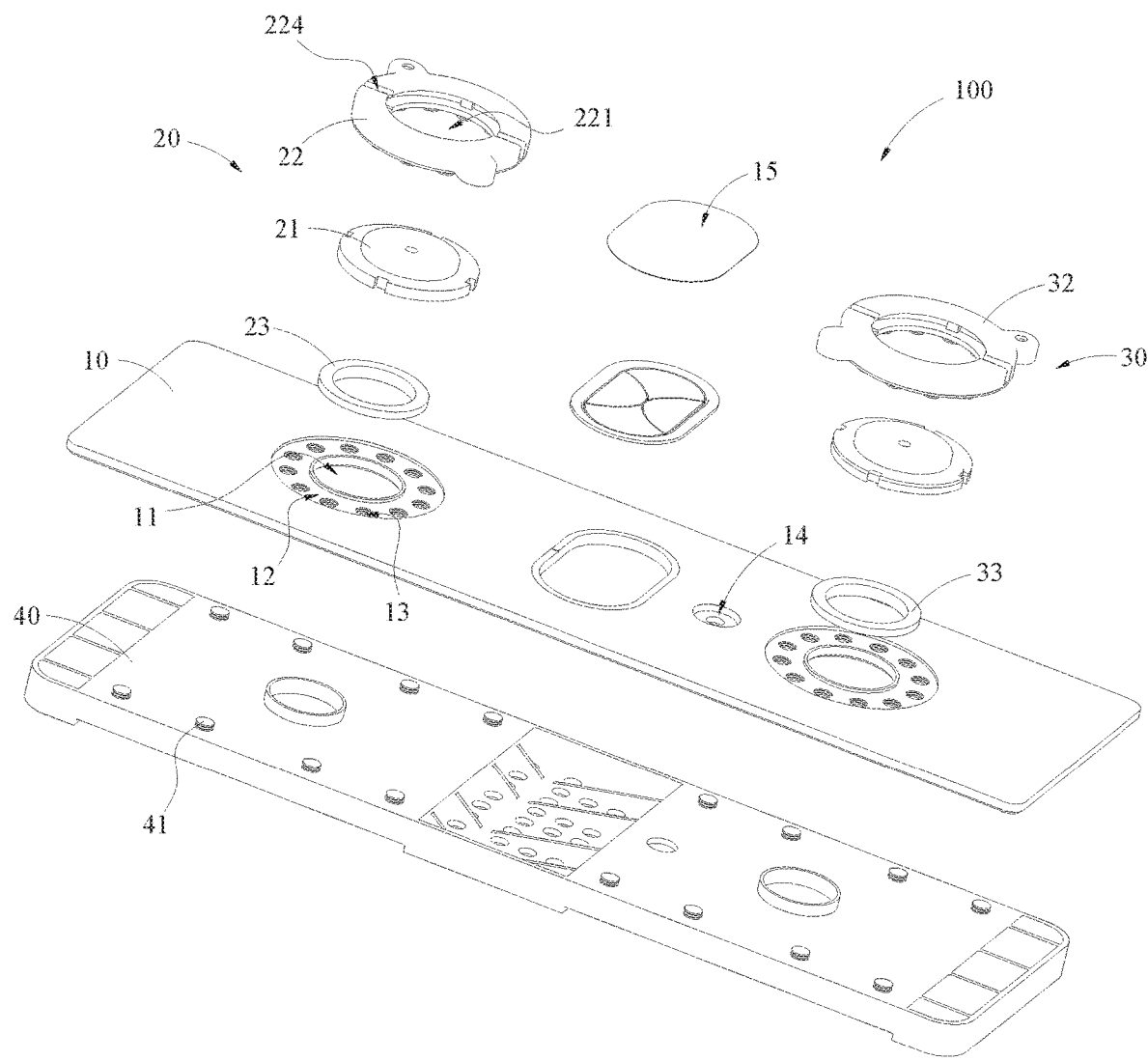
FIG. 1 is a schematic diagram of an exploded structure of a cap assembly according to an embodiment of the present disclosure.

100—Cap assembly
10—Cap plate
11—Electrode lead-out hole
12—Depressed portion
13—Undercut hole
14—Liquid injection hole
15—Anti-explosion valve assembly
16—Flange
20—Terminal assembly
21—Terminal board
211—Depressed portion
212—Recess
213—Recess
214—Notch
22—Fixing member
221—Through hole
222—Accommodation space
223—Protrusion
224—Opening portion
225—Undercut
226—Opening portion
23—Sealing member
231—Groove
30—Terminal assembly
32—Fixing member
33—Sealing member
40—Lower insulator
41—Undercut

DETAILED DESCRIPTION

The features and exemplary embodiments of the various aspects of the present disclosure will be described in detail below. In the following detailed description, numerous specific details are set forth in order to provide a thorough understanding of the present disclosure. It will be apparent, however, to those skilled in the art that the present disclosure may be practiced without some of these specific details. The following description of embodiments is only provided by illustrating examples for a better understanding of the present disclosure. In the drawings and the following description, at least a part of well-known structures and techniques are not shown in order to avoid unnecessarily obscuring the present disclosure. Further, for clarity, the size of a part of the structures may be exaggerated. The same reference numerals in the drawings denote the same or similar structures, and thus their detailed description will be omitted. Furthermore, the features, structures, or characteristics described below can be combined in any suitable manner in one or more embodiments.

The terms denoting directions that appear in the following description indicate directions shown in the drawings, and do not limit specific structures of the cap assembly and the secondary battery of the present disclosure. In the description of the present disclosure, it should also be noted that the terms "mounted", "connected" and "connection" should be interpreted in a broad sense unless explicitly defined and limited otherwise. For example, it may indicate "fixed connection", "disassemble connection" or "integral connection"; it may indicate a direct connection or an indirect connection. For those skilled in the art, specific meanings of the above terms in the present disclosure may be understood depending on specific situations.

The cap assembly of the secondary battery provided by an embodiment of the present disclosure can be connected at an opening of a case of the secondary battery to seal an electrode assembly and electrolyte into the case and enable an electrical connection between the electrode assembly and conductive parts outside the case. The cap assembly according to the embodiment of the present disclosure can reduce the occupancy of an internal space of the battery case while ensuring the sealing effect of the battery case. Therefore, energy density of the secondary battery can be increased, and reliability of the secondary battery in use can be ensured.

For a better understanding of the present disclosure, a cap assembly of a secondary battery and the secondary battery according to embodiments of the present disclosure will be described in detail below with reference to FIG. 1 to FIG. 11.

Figure 2:
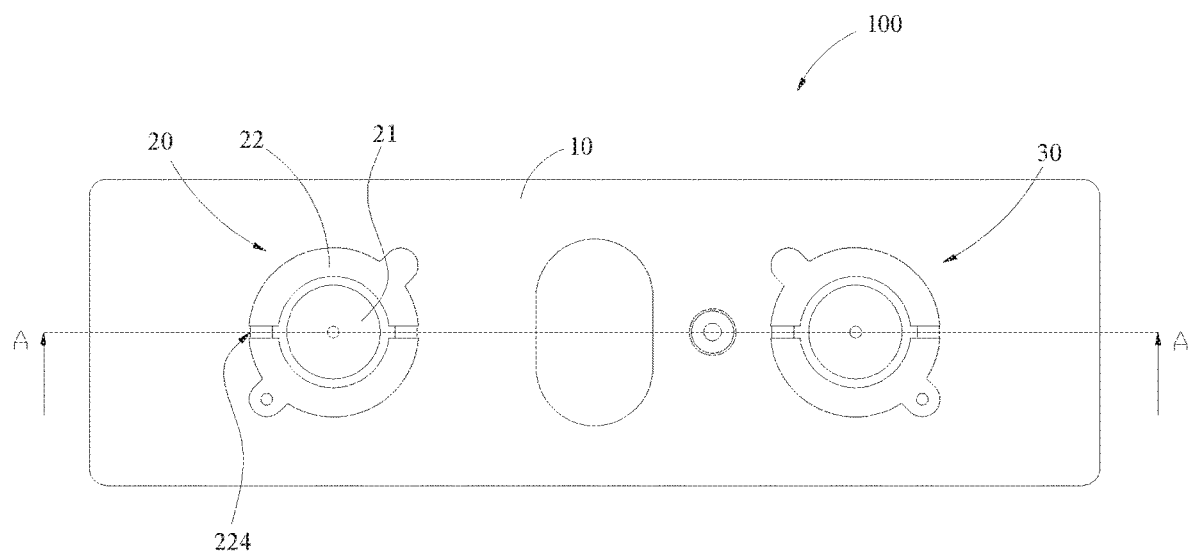
FIG. 2 is a schematic top view of a structure of the cap assembly of FIG. 1.
Figure 3:
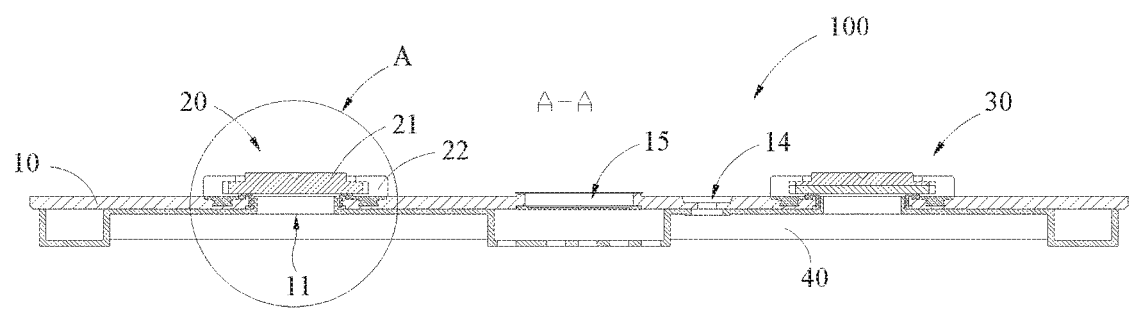
FIG. 3 is a schematic diagram of a cross-sectional structure of the cap assembly of FIG. 2 taken along a section line A-A.

FIG. 1 is a schematic diagram of an exploded structure of a cap assembly 100 according to an embodiment of the present disclosure; FIG. 2 is a schematic top view of a structure of the cap assembly 100 of FIG. 1; FIG. 3 is a cross-sectional structural diagram of the cap assembly 100 of FIG. 2 taken along a section line A-A. The structure diagram of the secondary battery is not shown in the figures. The secondary battery may generally include a cap assembly 100, a case and an electrode assembly located inside the case.

According to an embodiment of the present disclosure, the case may be made of metal material, such as aluminum, aluminum alloy, or nickel-plated steel. The case is formed in a rectangular box shape and has an opening to communicate to its inside accommodation space.

The electrode assembly may be formed by stacking or winding a first electrode plate, a second electrode plate, and a separator together, where the separator is an insulator interposed between the first electrode plate and the second electrode plate. In this embodiment, as an example, the description will be provided by taking the first electrode plate as a positive electrode plate and the second electrode plate as a negative electrode plate. Similarly, in other embodiments, the first electrode plate may be a negative electrode plate, and the second electrode plate may be a positive electrode plate. In addition, active materials for the positive electrode plate may be coated on a coating area of the positive electrode plate, and active materials for the negative electrode plate may be coated on a coating area of the negative electrode plate. A portion extending from the coating area of the first electrode plate is referred to as an electrode tab, i.e., a first electrode tab; and a portion extending from the coating area of the second electrode plate is referred to as a negative electrode tab, i.e., a second electrode tab (not shown in the figures).

The cap assembly 100 may be used to seal the case. The electrode assembly may be sealed in the case by the cap assembly 100 that is connected at the opening of the case. According to an embodiment of the present disclosure, the cap assembly 100 may generally include a cap plate 10, a terminal assembly 20, a terminal assembly 30 and a lower insulator 40.

Figure 4:
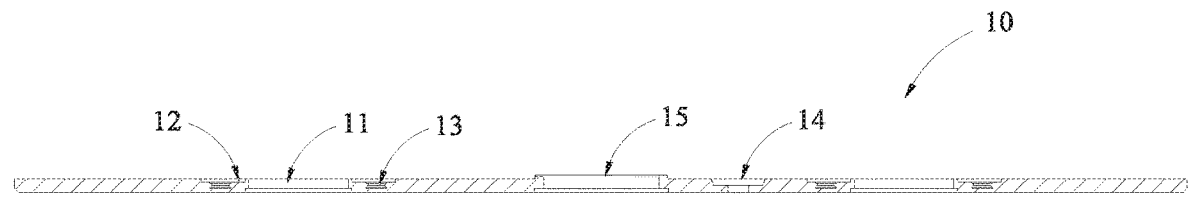
FIG. 4 is a schematic diagram of a cross-sectional structure of a cap plate in the cap assembly of FIGS. 1 to 3 taken along a length direction.

FIG. 4 is a schematic diagram of a cross-sectional structure of a cap plate in the cap assembly of FIGS. 1 to 3 taken along a length direction. As shown in FIG. 4, the cap plate 10 may be in the shape of a thin plate and have a size and shape matched with the opening of the case 200 so as to be capable of being connected at the opening of the case. The cap plate 10 may be made of metal material, for example, the same metal material as that of the case. In the embodiment, the cap plate 10 is provided with an electrode lead-out hole 11, a depressed portion 12, an undercut hole 13, a liquid injection hole 14 and an anti-explosion valve assembly 15.

The liquid injection hole 14 is formed on the cap plate 10 in a predetermined size, so that the electrolyte can be injected into the case through the liquid injection hole 14 after the cap plate 10 covers the opening of the case and is hermetically connected with the case. The anti-explosion valve assembly 15 may have a conventional structure (for example, by providing a rupture disk) and may be disposed at a substantially central position of the cap plate 10. When the gas pressure inside the second battery becomes too large as a result of over-charging, over-discharging, or over-heating of the second battery, the rupture disk in the anti-explosion valve assembly 15 can be broken so that the gas produced inside the secondary battery can be exhausted to the outside via a through hole of the anti-explosion valve assembly 15, thereby being able to prevent the secondary battery from exploding.

Figure 5:
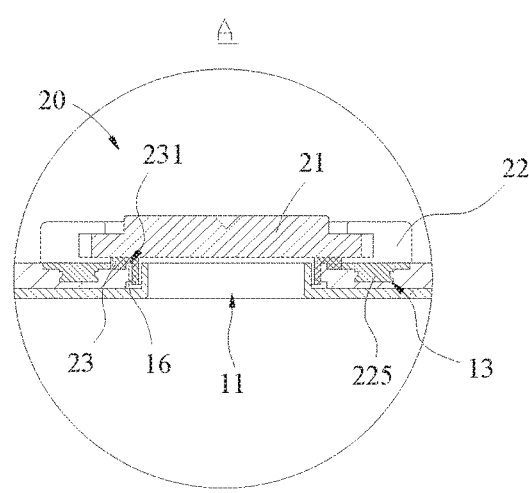
FIG. 5 is an enlarged partial view of a portion A of the cap assembly of FIG. 3.
Figure 6:
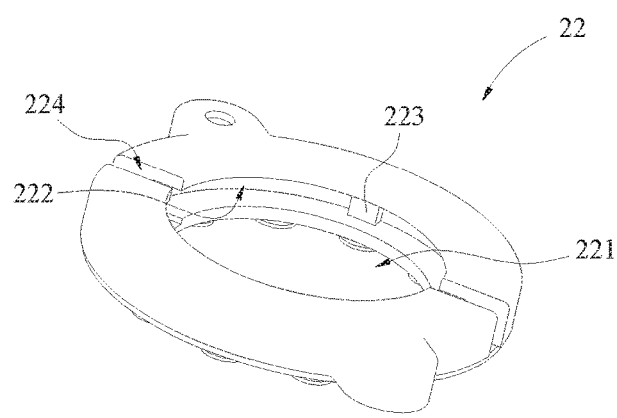
FIG. 6 is a schematic diagram of a three-dimensional structure of a certain state of a fixing member according to a first embodiment.
Figure 7:
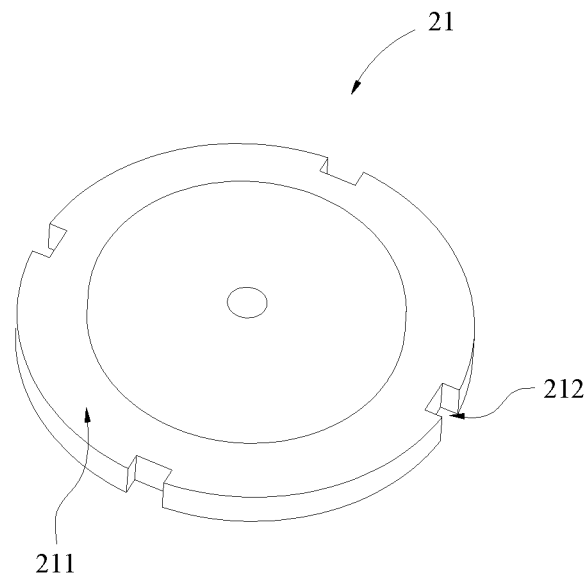
FIG. 7 is a schematic diagram of a three-dimensional structure of a terminal board according to a first embodiment of the present disclosure.

FIG. 5 is an enlarged partial view of a portion A of the cap assembly 100 of FIG. 3; FIG. 6 is a schematic diagram of a three-dimensional structure of a certain state of a fixing member 22 according to a first embodiment; FIG. 7 is a schematic diagram of a three-dimensional structure of a terminal board 21 according to a first embodiment of the present disclosure. With reference to FIG. 1 and FIGS. 5 to 7, according to an exemplary embodiment, the cap plate 10 may be provided with two electrode lead-out holes 11 for leading electric energy in the electrode assembly inside the case out of the cap plate 10. In an exemplary embodiment, the terminal assembly 20 may generally include a first electrode terminal, a fixing member 22 and a sealing member 23; likewise, the terminal assembly 30 may generally include a second electrode terminal, a fixing member 32 and a sealing member 33. The following description is merely given by way of example with the structure of the terminal assembly 20 and its mounting form on the cap plate 10. Also by way of example, the following description is given by assuming the terminal assembly 20 is a positive electrode terminal assembly and the terminal assembly 30 is a negative electrode terminal assembly.

The first electrode terminal may include a terminal board 21. In the embodiment, for example, the terminal board 21 has a structure of a circular (and alternatively square) sheet or plate, and an outer peripheral surface of the terminal board 21 is at least partially surrounded by the fixing member 22. In this way, the terminal board 21 may be mounted to the fixing member 22 and thus fixed to the cap plate 10 through the fixing member 22. In an alternative embodiment, the first electrode terminal may be a plate-like structure, and a surface of the first electrode terminal close to the cap plate 10 does not exceed a surface of the cap plate 10 close to the first electrode terminal (i.e., the first electrode terminal is composed of the terminal board 21 and does not protrude into the electrode lead-out hole 11).

The fixing member 22 may be a plastic member and integrally molded to the outer periphery of the terminal board 21. In an exemplary embodiment, the fixing member 22 is a hard plastic member. For example, the fixing member 22 may be made of high-temperature-resistant insulating plastic material such as one or more of polyphenylene sulfide (PPS), perfluoroalkoxy resin (PFA) or polypropylene (PP) by an integral injection molding process.

The fixing member 22 as shown in FIG. 6 is the fixing member 22 in the cap assembly 100 of FIGS. 1 to 3. In the embodiment, as an example, the fixing member 22 has a rotary structure and has an accommodation space 222 adapted to the shape of the terminal board 21. The accommodation space 222 is an annular receiving groove formed on an inner wall surface of a through hole 221 in a circumferential direction, so that the terminal board 21 may be accommodated in the accommodation space 222 and fixed to the terminal board 21. In this case, a part of the fixing part 22 may be clamped between the terminal board 21 and the cap plate 10.

In an alternative embodiment, in order to increase the fastening force with which the terminal board 21 and the fixing member 22 are engaged with each other, one of the terminal board 21 and the fixing member 22 may be provided with a recess and the other one of the terminal board 21 and the fixing member 22 may be provided with a protrusion adapted to the recess. Thus the electrode terminal and the fixing member 22 are restrained from rotating relative to each other by the fitted engagement of the recess and the protrusion. In the embodiment, the terminal board 21 is provided with a recess 212, and the fixing member 22 is provided with a protrusion 223 corresponding to the recess 212 of the terminal board 21.

With reference to both FIG. 6 and FIG. 7, exemplarily, the outer peripheral surface of the terminal board 21 is provided with a plurality of recesses 212 which are radially opened notches along the outer peripheral surface of the terminal plate 21, and each of the recesses 212 penetrates through the terminal board 21 in the thickness direction of the terminal board 21. The plurality of recesses 212 are spaced apart and evenly arranged in the circumferential direction of the terminal board 21. Correspondingly, protrusions 223 matched with the recesses 212 of the terminal board 21 are provided on an inner wall surface of the fixing member 22 in contact with the terminal board 21, that is, in the accommodation space 222. Again, the protrusions 223 of the fixing member 22 are radially protruded from the inner wall surface of the accommodation space 222. As such, when the terminal board 21 is placed in the accommodation space 222 of the fixing member 22, the recesses 212 and the protrusions 223 are engaged with each other in a snap-fit manner so that the terminal board 21 can be firmly connected with the fixing member 22. Therefore, it is possible to prevent the terminal board 21 and the fixing member 22 from rotating relative to each other to affect the structural stability of the cap assembly 100. At the same time, by providing the recesses 212 and the protrusions 223 that are fitted with each other, the contact area between the terminal board 21 and the fixing member 22 can be increased, and thus the engaging force between the terminal board 21 and the fixing member 22 can be further increased.

Since the terminal board 21 and the fixing member 22 in the embodiment of the present disclosure are formed by integrally injection molding, the specific shape of the recess 212 provided on the terminal board 21 may not be limited, and the recess 212 may be a regular or irregular notch. In addition, in the embodiment of the present disclosure, the depth of the recess 212 in the radial direction of the terminal board 21 is not limited, as long as the recess 212 can be fitted with the protrusion provided on the fixing member 22 and the provision of the recess 212 may not affect the performance of basic functions of the terminal board 21.

Of course, as shown in FIG. 7, the terminal board 21 may be provided with four recesses 212 in the circumferential direction, and two of the recesses 212 may be opposite to the other two of the recesses 212 respectively. Alternatively, only two recesses 212 opposite to each other may be provided, or more recesses 212 may be provided along the circumferential direction of the terminal board 21.

In addition, in order to fit with the accommodation space 222, an annular depressed portion 211 may be provided on the surface of the side of the terminal board 21 far away from the cap plate 10 in the circumferential direction. As such, the fixing member 22 can wrap the surface of the terminal board 21 on the side far away from the cap plate 10, so that the fixing member 22 can be more firmly engaged with the terminal board 21. Meanwhile, after the terminal board 21 and the fixing member 22 are engaged with each other and mounted on the cap plate 10, the overall thickness of the cap assembly 100 will not be increased, so that the space occupied by the secondary battery in the height direction can be saved to improve the energy density of the secondary battery. After the first electrode terminal and the fixing member 22 are connected to each other, the terminal board 21 covers the electrode lead-out hole 11 and the outer peripheral surface of the terminal board 21 protrudes from the inner wall of the electrode lead-out hole 11 (i.e., as shown in FIG. 4, the cross-sectional size of the terminal board 21 is greater than the cross-sectional size of the electrode lead-out hole 11), and the surface of the terminal board 21 far away from the cap plate 10 protrudes from the surface of the fixing member 22 far away from the cap plate 10 (i.e., the top surface of the terminal board 21 is higher than the top surface of the fixing member 22). Also, the through hole 221 is provided on the side of the fixing member 22 close to the cap plate 10 so that the terminal board 21 can be exposed inside the case via the through hole to be electrically connected with the electrode assembly.

Of course, the embodiment of the present disclosure is not limited thereto. In other embodiments, a protrusion may be provided on the outer circumferential surface of the terminal board 21, and correspondingly, a recess to be engaged with the protrusion may be provided on the inner wall surface of the fixing member 22 in contact with the terminal board 21. Likewise, it is also possible to achieve the purpose of restricting the relative rotation between the terminal board 21 and the fixing member 22. In addition, the dimensions of the recess and the protrusion in the thickness directions of the terminal plate 21 and the fixing member 22 are not limited in the embodiment of the present disclosure. In the above embodiment, the recesses are all provided to penetrate through the thickness of the terminal board 21. However, in other embodiments, the recess may be provided not to penetrate through the thickness of the terminal board 21, but may also be engaged with the corresponding protrusion of the fixing member 22 to prevent relative rotation between the terminal board 21 and the fixing member 22.

Figure 8:
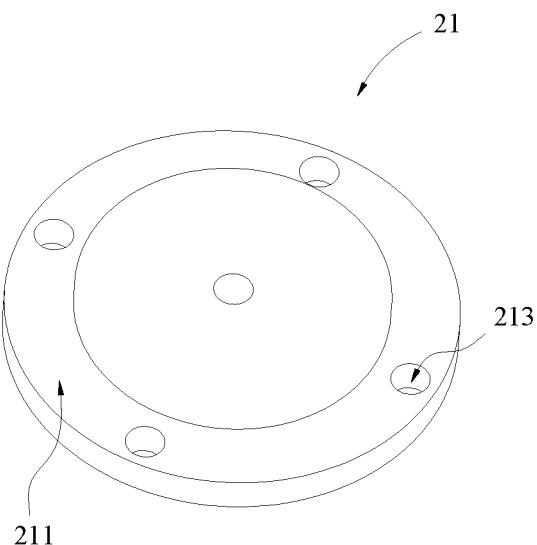
FIG. 8 is a schematic diagram of a three-dimensional structure of a terminal board according to a second embodiment of the present disclosure.

FIG. 8 is a schematic diagram of a three-dimensional structure of a terminal board 21 according to a second embodiment of the present disclosure. In the embodiment, the same parts in the terminal board 21 as in the terminal board 21 of the first embodiment are denoted by the same reference numerals, and the already described parts will not be described again. As shown in FIG. 8, different from the terminal board 21 of the first embodiment, in the present embodiment, in order to prevent relative rotation between the terminal board 21 and the fixing member 22, a recess 213 is provided on the terminal board 21, and the recess 213 is a through hole penetrating through the terminal board 21 in the thickness direction thereof. Correspondingly, a post (i.e., a protrusion, not shown in the figure) to be matched with the recess 213 is protruded from the surface of the fixing member 22 in contact with the terminal board 21. Since the peripheral edge of the terminal board 21 is embedded in the accommodation space 222 of the fixing member 22, the fixing member 22 can be provided with the above-mentioned post on an upper surface and/or a lower surface of the accommodation space 222 to be matched with the recess 213 of the terminal board 21.

Therefore, when the terminal board 21 is received in the accommodation space 222, the post provided in the fixing member 22 may be inserted into the recess 213 of the terminal board 21, so that the terminal board 21 can be firmly connected to the fixing member 22 by the snap fit of the recess 213 and the post. Of course, in other embodiments, the recess 213 may also be disposed to not penetrate through the terminal board 21 but only penetrate a predetermined depth in the thickness direction of the terminal board 21 to be engaged with the corresponding post provided in the fixing member 22. Again, it is also possible to achieve the purpose of restricting the relative movement between the terminal board 21 and the fixing member 22.

Figure 9:
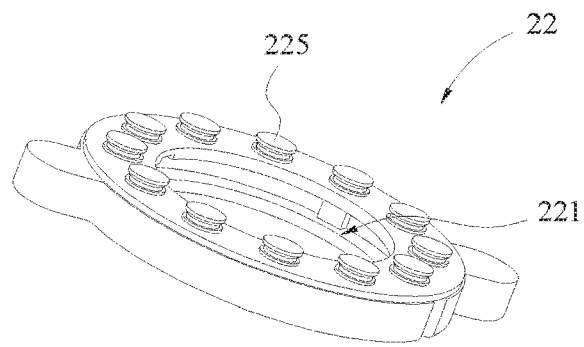
FIG. 9 is a schematic diagram of a three-dimensional structure of another state of the fixing member of FIG. 6.

FIG. 9 is a schematic diagram of a three-dimensional structure of another state of the fixing member 22 of FIG. 6. As shown in FIG. 1, FIG. 5 and FIG. 9, in order to fix the fixing member 22 to the cap plate 10, a connecting member including an undercut 225 and an undercut hole 13 may be further provided. The undercut 225 and the undercut hole 13 are correspondingly provided between the fixing member 22 and the cap plate 10 so as to be engaged with each other.

Particularly, at a surface of the cap plate 10 facing the terminal board 21, a plurality of undercut holes 13 may be disposed around the electrode lead-out hole 11. The plurality of undercut holes 13 may be arranged with regular intervals along the circumference, and an aperture of each undercut hole 13 may gradually increase along the direction from the fixing member 22 to the cap plate 10. Of course, the increasing of the aperture as mentioned herein does not require that the aperture of the undercut hole 13 regularly increases along the direction from the fixing member 22 to the cap plate 10, but means that the aperture of one end of the undercut hole 13 far away from the fixing member 22 is larger than that of the other end of the undercut hole 13 close to the fixing member 22. In other words, it is only required that the aperture of the bottom of the undercut hole 13 is larger than the aperture of the top of the undercut hole 13 so as to allow for the engagement between the undercut 225 and the undercut hole 13. Correspondingly, the undercut 225 adapted to the shape of the undercut hole 13 is provided at a surface of the fixing member 22 facing the cap plate 10. Thus, the fixing member 22 can be firmly fixed to the cap plate 10 by the engagement between the undercut 225 provided on the fixing member 22 and the undercut hole 13 provided on the cap plate 10. In this way, the fixing member 22 can be tightly fixed to the cap plate 10 by a simple structure to simplify the structure of the cap assembly 100, and meanwhile, the productivity and structural stability of the cap assembly 100 can be improved.

As shown in FIGS. 1 and 5, the sealing member 23 is provided between the terminal board 21 and the cap plate 10 and surrounds the electrode lead-out hole 11. In this embodiment, specifically, the sealing member 23 may be of an annular shape and provided with an annular groove 231 on the surface thereof facing the cap plate 10. The cap plate 10 may be provided with an annular flange 16 surrounding the electrode lead-out hole 11 on the side of the cap plate 10 facing the sealing member 23, so that the flange 16 of the cap plate 10 can be engaged with the groove 231. The terminal board 21 can press the sealing member 23 tightly toward the cap plate 10 under the fastening force of the fixing member 22, so that the sealing member 23 between the flange 16 and the terminal board 21 can be pressed tightly to make the sealing member 23 be in close contact with the terminal board 21 through the flange 16 and form a sealing line between the terminal board 21 and the cap plate 10. Thus, it is possible to improve the sealing between the terminal board 21 and the cap plate 10 and avoid the problem of liquid leakage due to bad sealing between the terminal board 21 and the cap plate 10, thereby further improve the reliability of use of the secondary battery.

In this embodiment, since the terminal board 21 is mounted on the cap plate 10 from top to bottom, the terminal board 21 may always apply a pressing force to the sealing member 23 under the effect of the fastening force of the fixing member 22 and the gravity of the terminal board 21 and the fixing member 22. Accordingly, the sealing performance of the sealing member 23 can be further improved. Also, the provision of the sealing member 23 outside the case can reduce the probability that the sealing member 23 may contact with the electrolyte inside the case.

During use of the secondary battery, when the pressure inside the case increases, the cap plate 10 may arch substantially along a center line in its width direction. When the cap plate 10 is deformed, the fixing member 22 generally does not deform due to the rigidity of the fixing member 22. In this case, it is possible to cause increased gaps between the fixing member 22 and both sides of the cap plate 10 in the width direction, so that the sealing member 23 cannot be pressed tightly between the terminal board 21 and the cap plate 10. For example, the undercuts 225 close to both sides of the cap plate 10 in the width direction of FIG. 5 may be disengaged from the undercut holes 13, so that the sealing member 23 cannot be pressed tightly by the terminal board 21 and the cap plate 10. In order to avoid an increase of gaps between the fixing member 22 and both sides of the cap plate 10 in the width direction and make the sealing member 23 be always pressed tightly between the terminal board 21 and the cap plate 10, the fixing member 22 may be further provided with a weakened portion so as to allow the fixing member 22 to deform along with the cap plate 10.

With continued reference to FIG. 1 and FIG. 6, in an alternative embodiment, the weakened portion of the fixing member 22 is close to the center line of the cap plate 10 in the width direction thereof. In this embodiment, since the fixing member 22 is a rotating body and the fixing member 22 includes two weakened portions, the two weakened portions are disposed on two opposite sides of the fixing member 22 in the radial direction. That is, the two weakened portions are respectively located on two sides of the electrode lead-out hole 11 in the length direction of the cap plate 10 (i.e., two sides of the through hole 221 in the length direction of the cap plate 10) and close to the center line of the cap plate 10 in the width direction thereof. The weakened portion of the fixing member 22 is close to the center line of the cap plate 10 in the width direction thereof means that the position of the weakened portion of the fixing member 22 needs to be distributed along the center line of the cap plate 10 in the width direction thereof so that the fixing member 22 can arch along the center line of the cap plate 10 in the width direction thereof and deform together with the cap plate 10. However, a certain error is allowed between the position of the weakened portion and the center line of the cap plate 10 in the width direction thereof, as long as the error does not affect the deformation of the fixing member together with the cap plate 10 so that the undercut 225 and the undercut hole 13 can keep in the status of being engaged with each other.

As an example, the weakened portion may be formed on the fixing member 22 by the provision of an opening portion 224. As shown in FIG. 6, the opening portion 224 may be formed on the side of the fixing member 22 facing away from the cap plate 10 along the thickness direction of the fixing member 22. The opening portion 224 is formed to have a predetermined depth in the thickness direction of the fixing member 22. The opening portion 224 is respectively opened on two sides of the fixing member 22 in the radial direction of the fixing member 22, so as to form notches that are provided on opposite sides of the through hole 221 of the fixing member 22 and connected to each other through the through hole 221 (i.e., the opening portion 224 penetrates through the fixing member 22 along the length direction of the cap plate 10). Therefore, by providing the opening portion 224 on opposite sides of the through hole 221 to form the weakened portion, the connection area of the fixing member 22 can be effectively reduced so that the fixing member 22 can be easily deformed along the weakened portion.

Thus, by providing the weakened portion on two sides of the through hole 221 of the fixing member 22 along the center line of the cap plate 10 in the width direction thereof, the fixing member 22 can be more easily deformed along the weakened portion. When the cap plate 10 is deformed and arched by a thrust force of the gas generated inside the case, the fixing member 22 can be arched along the weakened portion at the center line of the cap plate 10 in the width direction thereof together with the cap plate 10, so as to ensure that the undercut 225 and the undercut hole 13 are always in the snap fit state. Therefore, it is possible to prevent the fixing member 22 from being detached from the cap plate 10, improve the reliability of the use of the secondary battery and increase the service life of the secondary battery. At the same time, since it is not necessary to increase the strength of the cap plate 10 by increasing the thickness of the cap plate 10, the manufacturing cost of the cap assembly 100 can also be saved.

Of course, there is no limitation on the number of weakened portions on the fixing member 22. In other embodiments, more weakened portions may be provided on the fixing member 22, and preferably arranged on two sides of the through hole 221 along the length direction of cap plate 10. As a result, the fixing member 22 can be more easily deformed along with the cap plate 10 when the cap plate 10 is arched due to the gas inside the case. Also, the fixing member 22 can be more fitted with the arc formed by the cap plate 10 when the fixing member 22 is deformed along with the cap plate 10, so as to further ensure the stability of the connection between the undercut 225 and the undercut hole 13. It should be noted that it is necessary to provide the weakened portion on the fixing member 22 without affecting the structural stability of the fixing member 22 itself and ensure that the terminal plate 21 can be fixed to the cap plate 10 by the fixing member 22.

Figure 10:
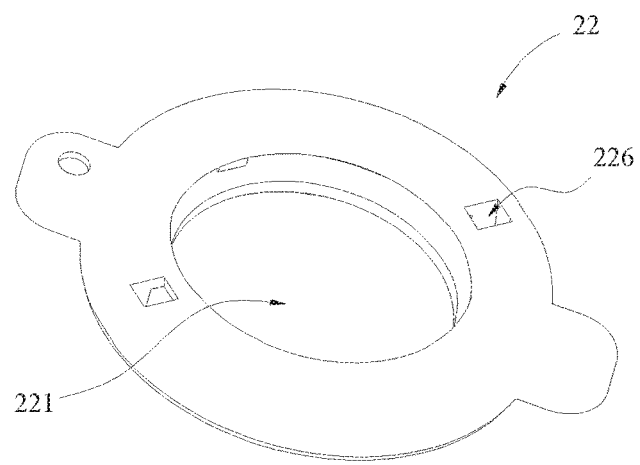
FIG. 10 is a schematic diagram of a three-dimensional structure of a fixing member according to a second embodiment of the present disclosure.

FIG. 10 is a schematic diagram of a three-dimensional structure of a fixing member 22 according to a second embodiment of the present disclosure. For ease of understanding, the same structures as in the fixing member 22 of the above embodiment are denoted by the same reference numerals, and the already described structures will not be described again. In the second embodiment, a weakened portion may be formed by the provision of an opening portion 226. Likewise, the opening portion 226 may also be provided on two sides of the through hole 221 along the length direction of the cap plate 10 and close to the center line of the cap plate 10 in the width direction thereof, and preferably be located along the center line of the cap plate 10 in the width direction thereof. However, the difference from the opening portion 224 in the above embodiment is that the opening portion 226 is a hole disposed on the surface of the fixing member 22 far away from the cap plate 10 and the opening portion 226 penetrates through the fixing member 22 in the thickness direction of the fixing member 22 (i.e., penetrates through the fixing member 22 in the thickness direction of the cap plate 10).

Thus, by providing the opening portion 226 on two sides of the through hole 221 to form the weakened portion, the connection area of the fixing member 22 can be effectively reduced so that the fixing member 22 can be easily deformed along the weakened portion. When the cap plate 10 is deformed and arched by a thrust force of the gas generated inside the case, the fixing member 22 can be arched along the weakened portion at the center line of the cap plate 10 in the width direction thereof together with the cap plate 10, so as to ensure that the undercut 225 and the undercut hole 13 are always in the snap fit state.

Based on the above embodiments, a recess 212 and a protrusion 223 capable of fitting with the recess 212 are correspondingly disposed between the terminal board 21 and the fixing member 22. In an alternative embodiment, the recess 212 provided along the outer peripheral surface of the terminal board 21 is located on the center line of the cap plate 10 in the width direction thereof. That is, the outer periphery of the terminal board 21 has at least two recesses 212 opposed to each other in the radial direction, and the two recesses 212 are located on the center line of the cap plate 10 in the width direction thereof. Therefore, by providing openings at both ends of the center line of the terminal board 21 in the width direction of the cap plate 10, a weakened area is formed at a portion of the terminal board 21 between the openings at both ends. In this way, the terminal board 21 can be allowed to deform along the weakened area. Thus, after the terminal board 21 and the fixing member 22 are engaged with each other and mounted on the cap plate 10, when the cap plate 10 is deformed under the thrust force of the gas inside the case, the terminal plate 21 and the fixing member 22 can be deformed along with the cap plate 10. Therefore, it is possible to avoid that the terminal board 21 and the fixing member 22 cannot be deformed along with the deformation of the cap plate 10, which may cause the fixing member 22 and the cap plate 10 to be disconnected from each other, eventually cause the terminal board 21 to be detached from the cap plate 10 and raise the problem of air leakage or liquid leakage. As a result, the reliability of the secondary battery can be further increased and the service life of the secondary battery can be lengthened.

Figure 11:
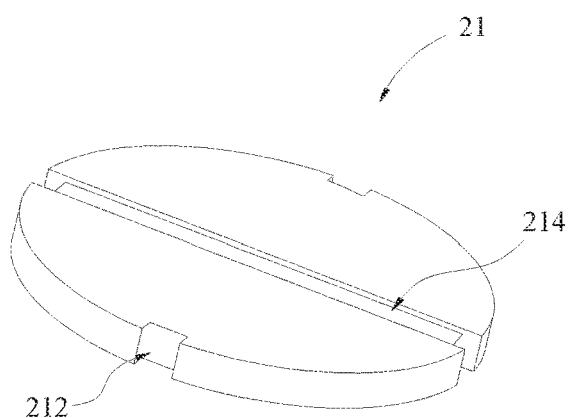
FIG. 11 is a schematic diagram of a three-dimensional structure of a terminal board according to a third embodiment of the present disclosure.

FIG. 11 is a schematic diagram of a three-dimensional structure of a terminal board 21 according to a third embodiment of the present disclosure. For ease of understanding, the same structures as in the terminal board 21 of the first embodiment are denoted by the same reference numerals, and the already described structures will not be described again. As shown in FIG. 11, in other alternative embodiments, in order to enhance the deformability of the terminal board 21, it is also possible to provide a weakened portion on the terminal board 21. As an example, in the embodiment, the surface of the terminal board 21 on the side close to the cap plate 10 may be provided with a notch 214 along the radial direction. When the terminal board 21 is assembled to the cap plate 10, the notch 214 extends in the length direction of the cap plate 10 and is located on the center line of the cap plate 10 in the width direction thereof. In the embodiment, the notch 214 is engaged between two recesses 212 opposite to each other, but in other embodiments, the notch 214 may be provided only on the surface of the terminal board 21 on the side close to the cap plate 10.

Thus, by providing the notch 214 to form the weakened portion of the terminal board 21 along the center line of the cap plate 10 in the width direction thereof, the terminal board 21 can be allowed to have deformation along the weakened portion. After the terminal board 21 and the fixing member 22 are engaged with each other and mounted on the cap plate 10, the terminal board 21 and the fixing member 22 can be deformed along with the cap plate 10 when the cap plate 10 is deformed by a thrust force of the gas inside the case. Therefore, it is also possible to further improve the reliability of the secondary battery and increase the service life of the secondary battery.

In addition, in the above embodiments, in order to maintain the insulation between the cap plate 10 and the electrode assembly inside the case as well as between the cap plate 10 and a wiring board, the lower insulator 40 may be generally made of plastic material, have a substantially plate shape, and be attached at the surface of the cap plate 10 on the side facing the interior of the case. The lower insulator 40 may include two through holes and first insulators disposed around the through holes. The two through holes are respectively opposite to the two electrode lead-out holes 11 provided on the cap plate 10, while the first insulators are respectively disposed around the periphery of the through holes.

Furthermore, in an alternative embodiment, an undercut 41 may be provided on the surface of the lower insulator 40 facing the cap plate 10. Correspondingly, an undercut hole to be matched with the undercut 41 may be provided on the surface of the cap plate 10 facing the case. With the similar way of engagement between the undercut 225 and the undercut hole 13, the lower insulator 40 can be fixed to the cap plate 10 through the undercut 41 and the undercut hole on the cap plate 10, which will not be described in detail here.

According to another embodiment of the present disclosure, there is also provided a secondary battery including a case, an electrode assembly, and a cap assembly 100 in any of the above embodiments. The case has an opening. The electrode assembly is accommodated in the case and includes a first electrode plate, a second electrode plate, and a separator disposed between the first electrode plate and the second electrode plate. The cap assembly 100 covers the opening of the case to enclose the electrode assembly in the case. Since the secondary battery has the same advantages as the cap assembly 100 in the above embodiments, it will not be described again.

In summary, in the secondary battery and the cap assembly of the secondary battery according to embodiments of the present disclosure, the terminal board is fixed to the fixing member and the fixing member is fixed to the cap plate through the connecting member, so that the terminal board is located on a side of the cap plate and covers the electrode lead-out hole of the cap plate. Therefore, the electrode terminal does not need to be provided with the base portion on the surface of the cap plate on the side facing the interior of the battery case. The space inside the case may not be occupied, thus the space occupancy in the case of the secondary battery can be increased and the energy density of the secondary battery can be further improved. In addition, by providing the weakened portion on the fixing member and close to the center line of the cap plate in the width direction thereof, when the cap plate is deformed to form an arch due to the gas generated inside the case of the secondary battery, the fixing member can be deformed along the weakened portion together with the cap plate. Thus it is possible to prevent an increase of gaps between both sides of the cap plate in the width direction and the fixing member and make the sealing member be always pressed tightly between the terminal board and the cap plate. Therefore, the structural reliability of the cap assembly of the secondary battery can be improved.

The invention may be embodied in other specific forms without departing from the spirit and essential characteristics thereof. The embodiments discussed therefore should be considered in all aspects as illustrative and not restrictive.

The scope of the invention is defined by the appended claims rather than by the foregoing description, and those modifications falling within the meaning and equivalents of the claims are thus intended to be embraced by the scope of the invention. Different technical features in different embodiments may be combined to obtain beneficial effects. Other variations of the described embodiments can be understood and practiced by those skilled in the art upon studying the drawings, the specification and the claims herein.

What is claimed is:

1. A cap assembly for a secondary battery, comprising: a cap plate, a fixing member, and an electrode terminal, wherein:

the cap plate has an electrode lead-out hole;

the fixing member is fixed to the cap plate and provided with a weakened portion that is close to a center line of the cap plate extending in a length direction of the cap plate; and the electrode terminal comprises a terminal board, wherein the terminal board has an outer peripheral surface at least partially surrounded by the fixing member so that the electrode terminal is fixed to the fixing member, and the terminal board is provided on a side of the cap plate and covers the electrode lead-out hole, wherein the terminal board is provided with two or more recesses spaced apart from each other in a circumferential direction on the outer peripheral surface of the terminal board, the fixing member is provided with two or more protrusions spaced apart from each other on an inner wall surface of the fixing member in contact with the terminal board, the protrusions are matched with the recesses and are engaged with the recesses in a snap-fit manner to limit a relative rotation between the terminal board and the fixing member, each recess is formed as a notch radially opened along the outer peripheral surface of the terminal board and extending through the entire terminal board in a thickness direction, and a part of the fixing member is clamped between a bottom surface of the terminal board and the cap plate.

2. The cap assembly of claim 1, wherein the fixing member comprises at least two weakened portions that are respectively located on two sides of the electrode lead-out hole in a length direction of the cap plate as well as on the center line of the cap plate extending in the length direction of the cap plate.

3. The cap assembly of claim 1, wherein the weakened portion comprises an opening portion that is formed on a surface of the fixing member on a side away from the cap plate.

4. The cap assembly of claim 2, wherein the weakened portion comprises an opening portion that is formed on a surface of the fixing member on a side away from the cap plate.

5. The cap assembly of claim 3, wherein the opening portion penetrates through the fixing member along a length direction of the cap plate; or the opening portion penetrates through the fixing member along a thickness direction of the cap plate.

6. The cap assembly of claim 4, wherein the opening portion penetrates through the fixing member along a length direction of the cap plate; or the opening portion penetrates through the fixing member along a thickness direction of the cap plate.

7. The cap assembly of claim 1, wherein the terminal board is provided with a notch on a surface of the terminal board on a side close to the cap plate or on a side away from the cap plate, and the notch extends along the length direction of the cap plate and is located at the center line of the cap plate extending in the length direction of the cap plate.

8. The cap assembly of claim 1, further comprises an undercut and an undercut hole; the undercut hole is provided on a surface of the cap plate facing the fixing member; the undercut hole has an aperture gradually increasing along a direction from the fixing member to the cap plate; and the undercut is connected to the fixing member and has a shape adapted to a shape of the undercut hole so as to be engaged with the undercut hole.

9. The cap assembly of claim 2, further comprises an undercut and an undercut hole; the undercut hole is provided on a surface of the cap plate facing the fixing member; the undercut hole has an aperture gradually increasing along a direction from the fixing member to the cap plate; and the undercut is connected to the fixing member and has a shape adapted to a shape of the undercut hole so as to be engaged with the undercut hole.

10. The cap assembly of claim 5, further comprises an undercut and an undercut hole; the undercut hole is provided on a surface of the cap plate facing the fixing member; the undercut hole has an aperture gradually increasing along a direction from the fixing member to the cap plate; and the undercut is connected to the fixing member and has a shape adapted to a shape of the undercut hole so as to be engaged with the undercut hole.

11. The cap assembly of claim 6, further comprises an undercut and an undercut hole; the undercut hole is provided on a surface of the cap plate facing the fixing member; the undercut hole has an aperture gradually increasing along a direction from the fixing member to the cap plate; and the undercut is connected to the fixing member and has a shape adapted to a shape of the undercut hole so as to be engaged with the undercut hole.

12. The cap assembly of claim 7, further comprises an undercut and an undercut hole; the undercut hole is provided on a surface of the cap plate facing the fixing member; the undercut hole has an aperture gradually increasing along a direction from the fixing member to the cap plate; and the undercut is connected to the fixing member and has a shape adapted to a shape of the undercut hole so as to be engaged with the undercut hole.

13. The cap assembly of claim 1, further comprising a sealing member that is provided between the terminal board and the cap plate and surrounds the electrode lead-out hole so as to seal the electrode lead-out hole.

14. The cap assembly of claim 13, wherein the sealing member is provided with an annular groove on a surface of the sealing member on a side facing the cap plate;
   the cap plate is provided with an annular flange to be matched with the groove on a surface of the cap plate on a side facing the sealing member; and the flange is inserted into the groove.

15. A secondary battery, comprising:
   a case having an opening;
   an electrode assembly accommodated in the case, comprising a first electrode plate, a second electrode plate and a separator disposed between the first electrode plate and the second electrode plate; and
   the cap assembly of claim 1, wherein the cap assembly covers the opening of the case and encloses the electrode assembly in the case.

16. The cap assembly of claim 1, wherein the fixing member comprises an accommodation space and a through hole penetrating the fixing member in a thickness direction of the cap plate, the accommodation space is an annular receiving groove provided on an inner wall surface of the through hole in a circumferential direction, and the terminal board is at least partially accommodated in the accommodation space.

17. The cap assembly of claim 1, wherein two recesses of the two or more recesses are opposed to each other and located on the center line of the cap plate extending in the length direction of the cap plate.

18. The cap assembly of claim 1, wherein the terminal board is formed as a circular sheet or plate.

* * * * *